(12) United States Patent
Zhang et al.

(10) Patent No.: US 9,980,294 B2
(45) Date of Patent: *May 22, 2018

(54) METHOD, ENODEB AND USER EQUIPMENT FOR TRANSMITTING RANDOM ACCESS RESPONSE MESSAGES

(71) Applicant: Huawei Technologies Co., Ltd., Shenzhen (CN)

(72) Inventors: Jiayin Zhang, Shanghai (CN); Yongming Liang, Shanghai (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/376,078

(22) Filed: Dec. 12, 2016

(65) Prior Publication Data

US 2017/0094690 A1    Mar. 30, 2017

Related U.S. Application Data

(63) Continuation of application No. 14/449,694, filed on Aug. 1, 2014, now Pat. No. 9,554,399, which is a (Continued)

(30) Foreign Application Priority Data

Feb. 3, 2012  (CN) .......................... 2012 1 0024487

(51) Int. Cl.
*H04W 4/00*  (2018.01)
*H04W 74/08* (2009.01)
(Continued)

(52) U.S. Cl.
CPC ........ *H04W 74/0833* (2013.01); *H04B 7/024* (2013.01); *H04W 74/002* (2013.01); *H04W 76/046* (2013.01)

(58) Field of Classification Search
CPC ........... H04W 74/0833; H04W 74/002; H04W 76/046; H04B 7/024
(Continued)

(56) References Cited

U.S. PATENT DOCUMENTS

2009/0305693 A1* 12/2009 Shimomura ........ H04W 74/004
                                                              455/422.1
2011/0222498 A1   9/2011 Chun et al.
(Continued)

FOREIGN PATENT DOCUMENTS

CN         101098297 A     1/2008
CN         101155405 A     4/2008
(Continued)

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 10)," 3GPP TS 36.321, V10.4.0, pp. 1-54, 3rd Generation Partnership Project, Valbonne, France (Dec. 2011).

*Primary Examiner* — Sai Ming Chan
(74) *Attorney, Agent, or Firm* — Leydig, Voit & Mayer, Ltd.

(57) ABSTRACT

A method, an eNodeB and a User Equipment for transmitting Random Access Response messages are provided. The method includes: receiving a random access preamble, wherein the random access preamble is transmitted by a user equipment on a random access channel; determining whether the user equipment belongs to a random access area central group or a random access area edge group according to the random access preamble; if the user equipment belongs to the random access area edge group, transmitting a first random access response (RAR) message to the user equipment, based on the random access preamble and a channel resource information.

12 Claims, 11 Drawing Sheets

Related U.S. Application Data continuation of application No. PCT/CN2013/071315, filed on Feb. 4, 2013.

(51) Int. Cl.
*H04W 76/04* (2009.01)
*H04B 7/024* (2017.01)
*H04W 74/00* (2009.01)

(58) Field of Classification Search
USPC .......................................................... 370/329
See application file for complete search history.

(56) References Cited

U.S. PATENT DOCUMENTS

| | | |
|---|---|---|
| 2011/0299486 A1 | 12/2011 | Wu |
| 2015/0327218 A1* | 11/2015 | Kim ...................... H04W 74/08 370/329 |

FOREIGN PATENT DOCUMENTS

| | | |
|---|---|---|
| CN | 101640922 A | 2/2010 |
| CN | 101873668 A | 10/2010 |
| CN | 101990311 A | 3/2011 |
| CN | 102264095 A | 11/2011 |
| WO | WO 2007078177 A1 | 7/2007 |

* cited by examiner

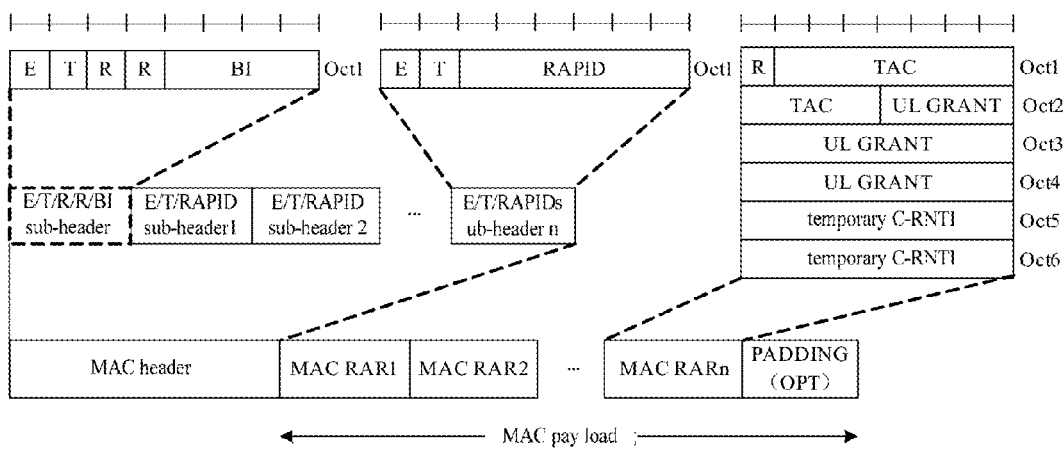

Fig. 5

140 transmit a first PDU set to the UE on a PDSCH, where the first PDU set includes at least one MAC PDU for carrying the RAR message, a random access area identity (RAAID) of the RAA is carried on a MAC header of a second MAC PDU of the at least one MAC PDU corresponding to the RAA, and the first RAR message is carried on a field of the second MAC PDU corresponding to a random access preamble identity (RAPID) of the RAP ～ S143 transmit a second PDCCH signaling scrambled by a second RA-RNTI to the UE through the PDCCH, where the second PDCCH signaling is adapted to indicate the first PDU set, the second RA-RNTI is determined from the channel resource information ～ S144

340

METHOD, ENODEB AND USER EQUIPMENT FOR TRANSMITTING RANDOM ACCESS RESPONSE MESSAGES

CROSS-REFERENCE TO RELATED APPLICATIONS

This application is a continuation of U.S. application Ser. No. 14/449,694, filed on Aug. 1, 2014, which is a continuation of International Application No. PCT/CN2013/071315, filed on Feb. 4, 2013, which claims priority to Chinese Patent Application No. 201210024487.8, filed on Feb. 3, 2012. All of the aforementioned applications are hereby incorporated by reference in their entireties.

FIELD OF TECHNOLOGY

The present application relates to the field of communication, and in particular to a method for transmitting a random access response message, a base station and a user equipment in the field of communication.

BACKGROUND

In a radio communication system, a terminal is required to establish a connection with a network, which is generally referred to as a random access procedure. In a long term evolution (abbreviated as "LTE") system, the random access procedure is generally required to be performed in the following situations: the terminal initially accessing to establish a radio link (transformed a radio resource control (abbreviated as "RRC") state from an idle state (RRC_IDLE) to a connected state (RRC_CONNECTED)); re-establishing a link after the radio link is interrupted; the terminal establishing an uplink synchronization with a target cell in a switching process; in the case that the terminal is in the RRC_CONNECTED state and the terminal does not established the uplink synchronization, establishing the uplink synchronization when uplink data or downlink data is received; a user located based on an uplink measurement; performing a scheduling request in the case where no special scheduling request resource is assigned on a physical uplink control channel (abbreviated as "PUCCH").

There is a contention based random access procedure and a non-contention based random access procedure in the LTE. The contention based random access procedure generally includes: randomly selecting, by a user equipment (abbreviated as "UE"), a random access preamble sequence from a RAP sequence set; sending the selected random access preamble sequence on a random access resource (a physical random access channel (abbreviated as "PRACH")) predetermined by a base station (eNodeB, abbreviated as "eNB"); receiving a random access response (abbreviated as "RAR") message issued by the base station, on a physical downlink shared channel (abbreviated as "PDSCH"); transmitting, by the UE, a random access procedure message to the base station on a physical uplink shared channel (abbreviated as "PUSCH") determined based on the RAR message according to a cell-radio network temporary identity (abbreviated as "C-RNTI") in the RAR message, where the random access procedure message includes an identifier of the UE located in this cell and is used for a contention resolution; and receiving, by the UE, a contention resolution message sent by the base station. In this way, the random access procedure may be implemented.

The non-contention based random access procedure includes: sending, by the UE, the random access preamble sequence predetermined by the base station, on the random access resources predetermined by the base station; and determining, by the UE, that the random access successes when the RAR message corresponding to the preamble sequence transmitted by the UE is received.

In 3rd generation partnership project (abbreviated as "3GPP"), four types of coordinated multi-point transmission (abbreviated as "CoMP") scenes are provided. In one scene, all transmission points share one cell identity (ID) in a macro region which includes a macro site and a radio remote head (abbreviated as "RRH"). This architecture is also referred to as a distribute antenna system (abbreviated as "DAS").

In the DAS system, in one cell, the base station only feeds back one RAR with respect to the identical PRACH preamble sequence identity detected on the same PRACH time frequency resource. Thus, the probability of the same random access preamble sequence selected by different UEs increases, as the number of the UEs increases. Therefore, the collision probability is increased during the transmission of the RAR and the success rate of the random access is reduced.

SUMMARY

A method for transmitting a random access response message, a base station and a user equipment are provided according to embodiments of the application, to reduce the collision probability during the transmission of the RAR and increase the success rate of the random access.

In one aspect, a method for transmitting a random access response message is provided according to an embodiment of the application. The method includes: receiving a random access preamble transmitted by user equipment on a random access channel; determining whether the user equipment belongs to a random access area central group or a random access area edge group according to the random access preamble; determining a random access area RAA to which the user equipment belongs, in the case where it is determined that the user equipment belongs to the random access area central group; and transmitting a first random access response RAR message to the user equipment based on the random access preamble, channel resource information of the random access channel and the RAA.

In another aspect, a method for transmitting a random access response message is provided according to an embodiment of the application. The method includes: determining whether user equipment belongs to a random access area central group or a random access area edge group; transmitting a first random access preamble corresponding to the random access area central group to a base station on a random access channel, in the case where it is determined that the user equipment belongs to the random access area central group; determining a random access area RAA to which the user equipment belongs; and detecting a first random access response RAR message transmitted by the base station based on the first random access preamble, channel resource information of the random access channel and the RAA.

In yet another aspect, a base station is provided according to an embodiment of the application. The base station includes: a receiving module adapted to receive a random access preamble transmitted by user equipment on a random access channel; a first determining module adapted to determine whether the user equipment belongs to a random access area central group or a random access area edge group according to the random access preamble received by the receiving module; a second determining module adapted to determine a random access area RAA to which the user equipment belongs, in the case where the first determining module determines that the user equipment belongs to the random access area central group; and a first transmitting module adapted to transmit a first random access response RAR message to the user equipment based on the random access preamble received by the receiving module, channel resource information of the random access channel and the RAA determined by the second determining module.

In yet another aspect, a user equipment is provided according to an embodiment of the application. The user equipment includes: a first determining module adapted to determine whether the user equipment belongs to a random access area central group or a random access area edge group; a first transmitting module adapted to transmit a first random access preamble corresponding to the random access area central group to a base station on a random access channel, in the case where the first determining module determines that the user equipment belongs to the random access area central group; a second determining module adapted to determine a random access area RAA to which the user equipment belongs; and a first detecting module adapted to detect a first random access response RAR message transmitted by the base station based on the first random access preamble transmitted by the first transmitting module, channel resource information of the random access channel, and the RAA determined by the second determining module.

Based on the above technical solution, in the method for transmitting a random access response message, the base station and the user equipment according to the embodiments of the present application, the RAR message is transmitted on the basis of the random access preamble and the RAA. Thus, different RAR messages are transmitted in response to random access requests which are sent by the user equipment in different RAAs based on the same random access preamble. In this way, the collision probability may be reduced during the transmission of the RAR and the success rate of the random access may be increased.

BRIEF DESCRIPTION OF THE DRAWINGS

FIG. 5 is a structural schematic diagram of a frame for carrying a random access response message according to an embodiment of the present application;

FIG. 6 is a schematic flowchart of another method for transmitting a first random access response message according to an embodiment of the present application;

DETAILED DESCRIPTION OF EMBODIMENTS

The technical solution according to the embodiments of the present application is described clearly and completely as follows in conjunction with the accompany drawings in the embodiments of the present application. It is obvious that the described embodiments are only a part of the embodiments according to the present application. All the other embodiments obtained by those skilled in the art based on the embodiments in the present application without any creative work belong to the scope of the present application.

It should be understood that the technical solution according to embodiments of the present application may be applied to a variety of communication systems such as global system of mobile communication (abbreviated as "GSM") system, code division multiple access (abbreviated as "CDMA") system, wideband code division multiple access (abbreviated as "WCDMA") system, general packet radio service (abbreviated as "GPRS") system, long term evolution (abbreviated as "LTE") system, LTE frequency division duplex (abbreviated as "FDD") system, LTE time division duplex (abbreviated as "TDD") system, universal mobile telecommunication system (abbreviated as "UMTS"), worldwide interoperability for microwave access (abbreviated as "WiMAX") communication system.

It should also be understood that, in the embodiment of the present application, a user equipment (abbreviated as "UE") may be referred to as a terminal, a mobile station (abbreviated as "MS"), a mobile terminal, and the like. The UE may communicate with one or more core networks via a radio access network (abbreviated as "RAN"). For example, the UE may be a mobile phone (or referred to as "cellular" phone), a computer with a mobile terminal and the like. For example, the UE may also be a portable mobile device, a pocket-sized mobile device, a handheld mobile device, a mobile device built-in a computer, or an onboard mobile device, which exchanges voice and/or data with the RAN.

In the embodiment of the present application, a base station may be a base transceive station (abbreviated as "BTS") in GSM or CDMA, or may be a NodeB (abbreviated as "NB") in WCDMA, or may also be an evolutional Node B (abbreviated as eNB or e-NodeB) in LTE; which will not be limited herein. For the purpose of description, the UE and the eNB are taken as an example for explaining as follows.

Figure 1:
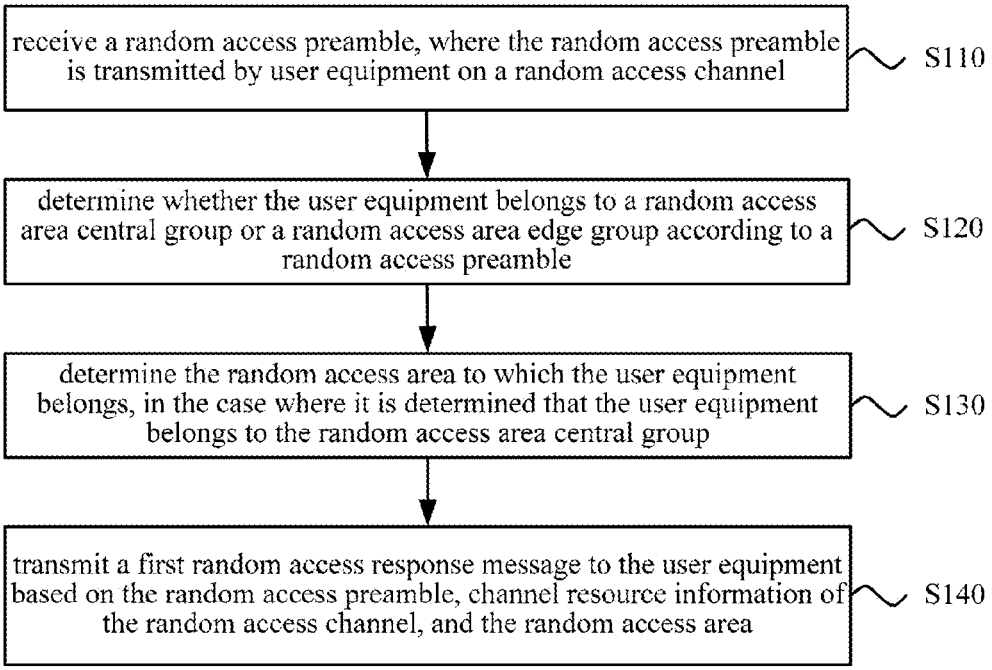
FIG. 1 is a schematic flowchart of a method for transmitting a random access response message according to an embodiment of the present application.

FIG. 1 illustrates a schematic flow chart of a method 100 for transmitting a random access response message according to an embodiment of the present application. As illustrated in FIG. 1, the method 100 includes: Step 110 to Step 140.

Step 110 is to receive a random access preamble, where the random access preamble is transmitted by the UE on a random access channel.

Step 120 is to determine whether the UE belongs to a random access area central group or a random access area edge group according to the random access preamble.

Step 130 is to determine a random access area (RAA) to which the UE belongs, in the case where it is determined that the UE belongs to the random access area central group.

Step 140 is to transmit a first random access response (RAR) message to the UE based on the random access preamble, channel resource information of the random access channel, and the RAA.

The base station may receive the random access preamble transmitted by the UE on the random access channel, and determine whether the UE belongs to the random access area central group or the random access area edge group according to the random access preamble. In the case that the UE belongs to the random access area central group, the base station determines a random access area (RAA) to which the UE belongs, and transmits the first random access response (RAR) message to the UE based on the random access preamble, the channel resource information of the random access channel and the RAA.

Therefore, with the method for transmitting the random access response message according to the embodiment of the present application, the RAR message may be transmitted on the basis of the random access preamble (RAP) and the RAA, and thus different RAR messages may be transmitted in response to random access requests which are sent by the UEs in different RAAs based on the same RAP. In this way, the collision probability may be reduced during the transmission of the RAR and the success rate of the random access may be increased.

In another aspect, the method for transmitting the random access response message according to the embodiment of the present application can avoid a complex detection of the base station and a long random access response time due to the increased RAP. Therefore, the random access preamble may be allocated to cells flexibly, a random access response time may be shortened and user experience may be improved.

In Step 110, the base station receives a random access preamble (abbreviated as "RAP") transmitted by the UE on a random access channel. The random access channel may include a PRACH channel. The random access preamble may include a random access channel (RACH) preamble sequence in LTE system. For example, the base station receives the random access channel preamble sequence transmitted by the UE on the PRACH.

It should be understood that the UE requests to perform a random access by transmitting the random access preamble to the base station. It also should be understood that multiple UEs in one random access area may share one time frequency code resource of the random access channel to transmit the random access preamble. That is, one RACH may carry the random access preambles transmitted by multiple UEs in one random access area.

In Step 120, the base station determines whether the UE belongs to the random access area central group or the random access area edge group according to the random access preamble. In a cell, all available RAPs may be divided into two groups, which are used by the UEs of the random access area central group and the UEs of the random access area edge group respectively. Thus, the base station can determine whether the UE belongs to the random access area central group or the random access area edge group according to the received random access preamble or a random access preamble identity.

For example, it is assumed that there are 64 available RAPs in the cell. The former 32 RAPs are preset to be used by the random access area edge group and the later 32 RAPs are preset to be used by the random access area central group. When receiving one RAP of the later 32 RAPs transmitted by the UE, the base station can determine that the UE transmitting the RAP belongs to the random access area central group. The reverse is true.

It should be understood that in any random access area of the cell, all UE may be divided into two groups. One group belongs to the random access area central group (abbreviated as "central group"), and the other group belongs to the random access area edge group (abbreviated as "edge group"). The random access preamble sent by the UE of the central group on a random access channel (for example, PRACH) may only be reliably received by the macro site or the RRH for covering the random access area to which the UE belongs, but is unable to be received or cannot be received correctly by the other macro sites or RRHs. In addition, the random access preamble sent by the UE of the edge group on a random access channel may be reliably received by one or more macro sites or RRHs for covering the random access area to which the UE belongs.

In Step 130, in the case that the UE belongs to the random access area central group, the base station determines the random access area to which the UE belongs.

The region covered by uplink reception points of the base station which includes the macro site and the RRH may be divided into several random access areas (abbreviated as "RAA"). It should be assured that the coverage area of those RAAs overlap as smaller as possible. The random access areas may be divided in accordance with a path-loss of an uplink channel or a geographical location. Therefore, the base station may determine the random access areas to which the UE belongs according to the path-loss of the uplink channel or the geographical location, due to different division rules of the random access areas. Furthermore, the random access areas may be divided in accordance with the other division rules, which will not be limited by embodiment of the present application.

Figure 2:
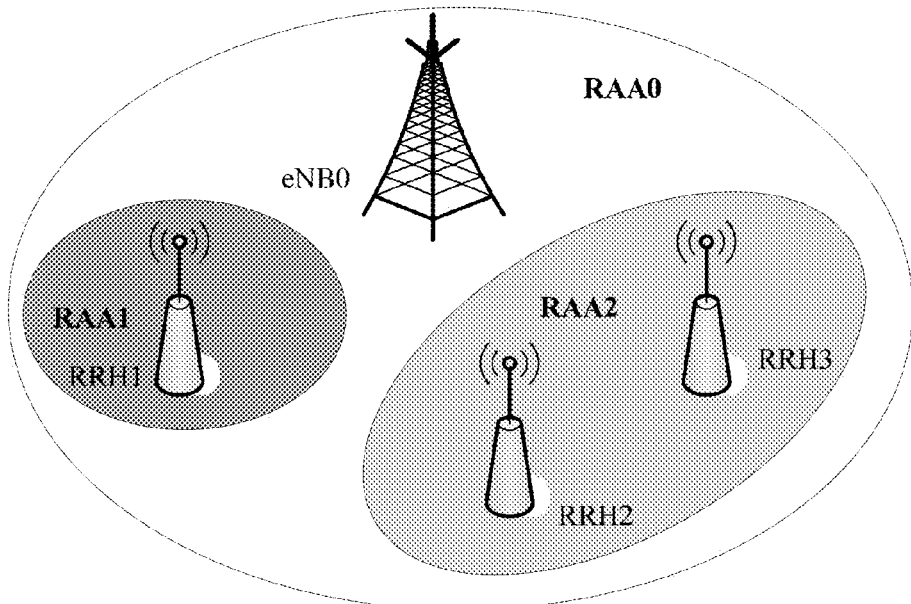
FIG. 2 is a schematic diagram of a random access area according to an embodiment of the present application.

When the RAAs are divided in accordance with the path-loss of the uplink channel, the path-loss from the UE which belongs to the random access area to the micro site or the RRH which covers the random access area is minimal. An RAA may include regions covered by the one or more RRHs. In this case, the path-loss is a path-loss of the uplink joint reception. As illustrated in FIG. 2, the whole coverage region of the cell may be divided into three random access areas: RAA0, RAA1, and RAA2. The path-loss from the UE in the RAA1 to the RRH1 is minimal. The joint path-loss from the UE in the RAA2 to the RRH2 and the RRH3 is minimal. The other region of the cell which does not belongs to the RRA1 and the RRA2 belongs to the RAA0. The base station may determine which the RAA the UE belongs to according to the RRH receiving the random access preamble sequence of the UE. In addition, because a large-scale fading of the channel in the uplink is different from that in the downlink, the UE may obtain the RAA thereof by measuring the path-loss of a downlink pilot signal or a reference signal (abbreviated as "RS") from each RRH or macro site.

When the RAA is divided in accordance with the geographical location, the base station may locate the UE by detecting the random access channel on which the transmission of the UE is performed, and thus determine the random access area to which the UE belongs. For example, the base station may locate the UE by detecting the PRACH, and thus determine the random access area to which the UE transmitting the random access preamble sequence belongs. On the other hand, the UE may obtain a geographical location thereof by a global positioning system (abbreviated as "GPS") provided on the UE, and thus determine the random access area to which the UE belongs.

In Step 140, the base station transmits a first random access response (RAR) message to the UE based on the random access preamble, channel resource information of the random access channel, and the RAA.

The channel resource information for example includes: time frequency resource information of the random access channel, such as a sub-frame identity and a frequency band identity of the sub-frame occupied by the PRACH. For example, the base station transmits the first RAR message to the UE based on a random access preamble identity, the sub-frame identity and the frequency band identity of the PRACH and an identity of the RAA to which the UE belongs. In this way, when the UEs in different random access areas send a random access request based on the same random access preamble, the base station may transmit the RAR messages of individual UEs, and thus individual UEs may perform the subsequent random access process according to their RAR messages.

Therefore, with the method for transmitting the random access response message according to the embodiment of the present application, the RAR message is transmitted on the basis of the random access preamble and the RAA. Thus, different RAR messages may be transmitted in response to the random access requests in different random access areas based on the same random access preamble. Therefore, the collision probability is reduced during the transmission of the RAR and the success rate of the random access is increased.

Figure 3:
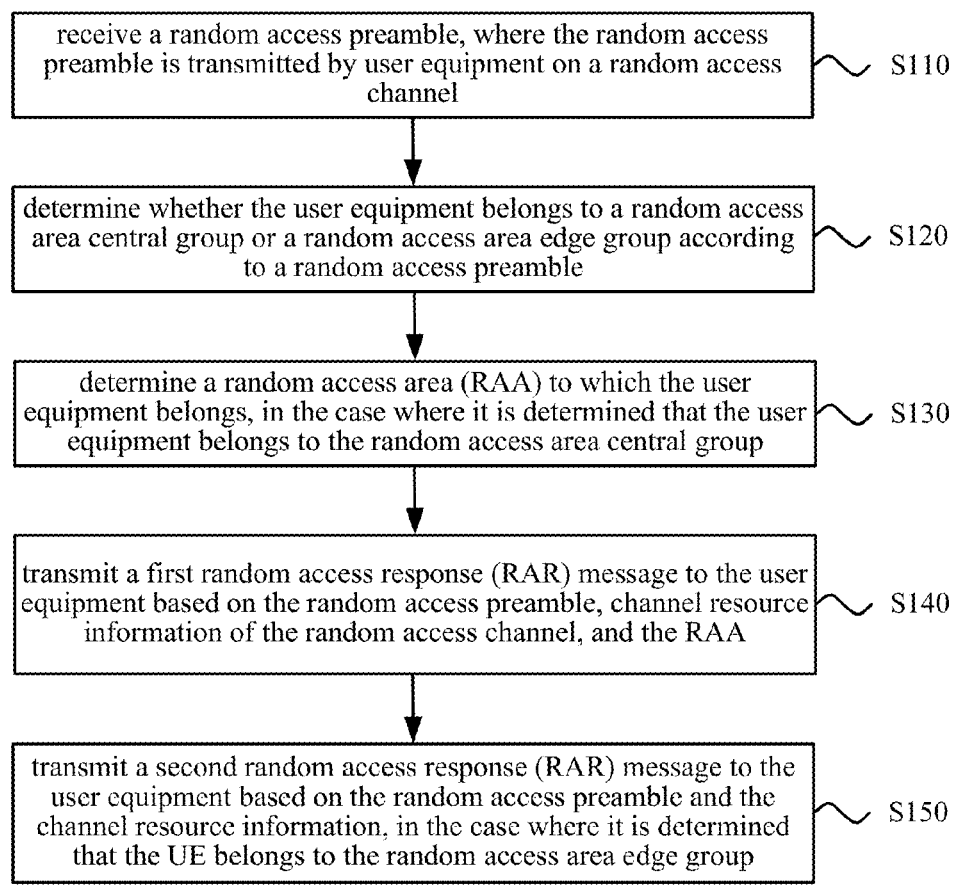
FIG. 3 is a schematic diagram of another method for transmitting a random access response message according to an embodiment of the present application.

In the embodiment of the present application, as illustrated in FIG. 3, a method 100 for transmitting a random access response message according to the embodiment of the present application further includes Step 150.

Step 150 is to transmit a second random access response message to the UE based on the random access preamble and the channel resource information, in the case that the UE belongs to the random access area edge group.

In the embodiment of the present application, for the random access preamble transmitted by the UE which belongs to the random access area edge group, the base station transmits to the UE the second random access response message corresponding to the random access preamble, only based on the random access preamble and the channel resource information of the random access channel for transmitting the random access preamble, but the random access area to which the UE belongs may not be considered. That is, regardless of whether the UEs belong to the same random access area, the base station only transmits one random access response message with respect to the same RAP.

It should be understood that in the contention based random access process, after transmitting the first RAR message or the second RAR message, the base station may receive a random access process message transmitted by the UE according to the RAR message, where the random access process message includes an identifier of the UE in the cell; and transmits a contention resolution message to the UE according to the random access process message, to complete a whole random access process.

It should be understood that the base station may carry the second RAR messages of multiple UEs of the cell in one medium access control (abbreviated as "MAC") protocol data unit (abbreviated as "PDU"). A MAC header of the MAC PDU is adapted to indicate the second RAR message corresponding to the random access preamble. The base station transmits a physical downlink control channel (abbreviated as "PDCCH") signaling to the UE through the PDCCH. The PDCCH signaling is scrambled by a random access radio network temporary identity (RA-RNTI) determined from the random access preamble and the channel resource information. The PDCCH signaling is adapted to indicate the MAC PDU.

A method for transmitting a first random access response message according to the embodiment of the present application is described in detail as follows in conjunction with FIGS. 4 to 8, taking an LTE system as an example.

Figure 4:
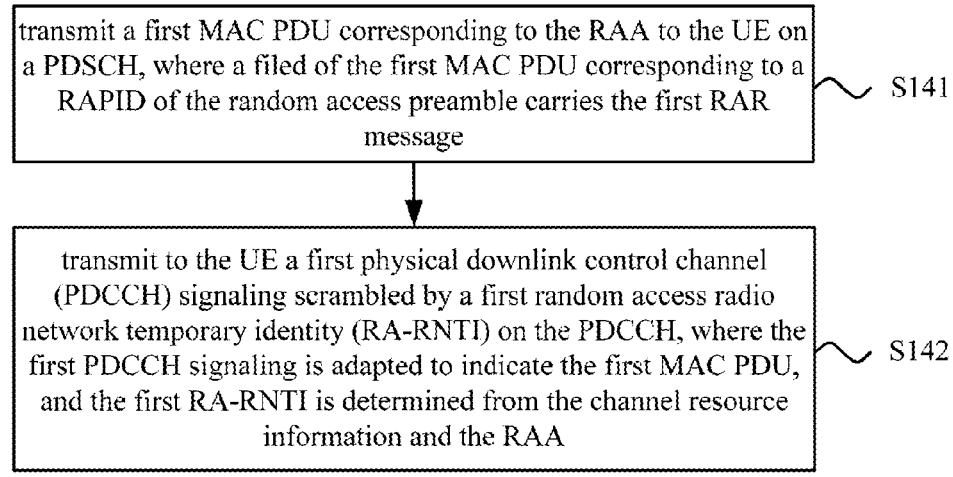
FIG. 4 is a schematic flowchart of a method for transmitting a first random access response message according to an embodiment of the present application.

As illustrated in FIG. 4, the method 140 for transmitting the first random access response message according to the embodiment of the present application may include: Step 141 to Step 142.

Step 141 is to transmit a first MAC PDU corresponding to the RAA to the UE on a physical downlink shared channel (PDSCH), where a field of the first MAC PDU corresponding to a random access preamble identity (RAPID) of the random access preamble carries the first RAR message.

Step 142 is to transmit to the UE a first physical downlink control channel (PDCCH) signaling scrambled by a first random access radio network temporary identity (RA-RNTI) on the PDCCH, where the first PDCCH signaling is adapted to indicate the first MAC PDU, and the first RA-RNTI is determined from the channel resource information and the RAA.

In Step 141, the base station may transmit one MAC PDU to each UE which requests to perform a random access in the random access area, and the MAC PDU carries the corresponding first RAR message. The base station may also transmit one MAC PDU with respective to each random access area in which the random access preamble is detected. Each MAC PDU carries the first RAR message of at least one UE which request to perform the random access in the random access area, as illustrated in FIG. 5.

In FIG. 5, the MAC PDU includes a MAC header with multiple sub-headers corresponding to the MAC RAR field. In the MAC sub-header of the MAC PDU, E represents an extension field (Extension) and is adapted to indicate whether there are other MAC sub-headers behind the MAC sub-header. T represents a type field (Type) and is adapted to indicate whether the MAC sub-header includes a back-off indicator (abbreviated as "BI") or a random access preamble identity (abbreviated as "RAPID"). R represents a reserve field (Reserve) and may be set to 0. BI indicates a random backoff value in the case where the random access channel (abbreviated as "RACH") fails. RAPID represent a value of the random access preamble identity. In the MAC RAR field of the MAC PDU, TAC represents a timing advance command and is adapted to notify the UE to bring forward a time for transmitting uplink data to implement uplink synchronization. UL GRANT represents uplink resource grant (Uplink Grant, abbreviated as "UL Grant"), and is adapted to notifying UE to transmit information, such as time frequency resource of Msg3 and a used modulation and encoding mode. Temporary C-RNTI represents temporary cell radio network temporary identity, and is used as information conveyed identity of Msg3 and Msg4. A PADDING field of the MAC PDU may be set to 0.

In Step 142, the first RA-RNTI for scrambling the first PDCCH signaling may be determined from the time frequency resource information of the PRACH and the RAA corresponding to the MAC PDU. Optionally, the value M of the first RA-RNTI is determined by the following equation (1):

$$M = 1 + T\_ID + 10 \times F\_ID + X \quad (1)$$

where T_ID is a value of a sub-frame identity in the channel resource information, F_ID is a value of a frequency band identity in the channel resource information, and X is an offset related to the RAA.

In an embodiment, in the LTE system, T_ID is a serial number of a first sub-frame for transmitting PRACH to the UE, and ranges from 0 to 9; F_ID is a serial number of the sub-frame carrying PRACH on the frequency domain, and ranges from 0 to 5.

In an embodiment of the present application, the offset X may be determined by the following equation (2):

$$X = RAA\_ID \times [1 + \max(T\_ID) + 10 \times \max(F\_ID)] \quad (2)$$

where RAA_ID is a value of a random access area identity (RAAID) of the RAA. Optionally, RAA_ID=0 in the case where the UE belongs to the random access area edge group. That is, the RA-RNTI for scrambling the PDCCH signaling is determined from the random access preamble and the time frequency resource of the PRACH, when the UE belongs to the random access area edge group.

In an embodiment of the present application, because the offset X is added to the first RA-RNTI, the value of the first RA-RNTI may be larger than 60 (003C). Thus, the corresponding table for defining the RNTI is modified to the form as illustrated in Table 1

TABLE 1

| Value (hexa-decimal) | RNTI |
|---|---|
| 0000 | N/A |
| 0001-FFF3 | RA-RNTI, C-RNTI, SPS C-RNTI, temporary C-RNTI, TPC-PUCCH-RNTI, and TPC-PUSCH-RNTI |
| FFF4-FFFC | reserved |
| FFFD | M-RNTI |
| FFFE | P-RNTI |
| FFFF | SI-RNTI |

In Table 1, C-RNTI represents a cell radio network temporary identity. SPS C-RNTI represents a semi-persistent scheduling cell radio network temporary identity. TPC-PUCCH-RNTI represents a physical uplink control channel transmission power control (abbreviated as "TPC") RNTI. TPC-PUSCH-RNTI represents a physical uplink shared channel transmission power control RNTI. M-RNTI represents a multicast RNTI. P-RNTI represents a paging RNTI. SI-RNTI represents a system information RNTI.

In an embodiment of the present application, as shown in FIG. 6, a method 140 for transmitting a first random access response message according to an embodiment of the present application may include Step 143 to Step 144.

In Step 143, the base station transmits a first PDU set to the UE on a physical downlink shared channel (PDSCH), where the first PDU set includes at least one MAC PDU for carrying the RAR message, a random access area identity (RAAID) of the RAA is carried on a MAC header of a second MAC PDU of the at least one MAC PDU corresponding to the RAA, and the first RAR message is carried on a field of the second MAC PDU corresponding to a random access preamble identity (RAPID) of the RAP.

In Step 144, the base station transmits to the UE a second PDCCH signaling scrambled by a second RA-RNTI on the PDCCH, where the second PDCCH signaling is adapted to indicate the first PDU set, the second RA-RNTI is determined from the channel resource information.

In Step 143, the base station may transmit the first PDU set to the UE on the PDSCH. The first PDU set may include only one MAC PDU. The MAC PDU carries a first RAR message of the UE which requests to perform a random access in a RAA, where the random access preamble (abbreviated as "RAP") is detected in the RAA. The MAC header of the MAC PDU may carry the RAAID for indicating the RAA. The first PDU set may also include at least one MAC PDU for carrying the RAR message. The number of the at least one MAC PDU may be as same as the number of the RAA in which the random access preamble is detected by the base station. The random access area identity (RAAID) of the RAA is carried on the MAC header of the second MAC PDU corresponding to the RAA in the at least one MAC PDU. The first RAR message is carried on the field of the second MAC PDU corresponding to the random access preamble identity (RAPID) of the RAP.

Figure 7A:
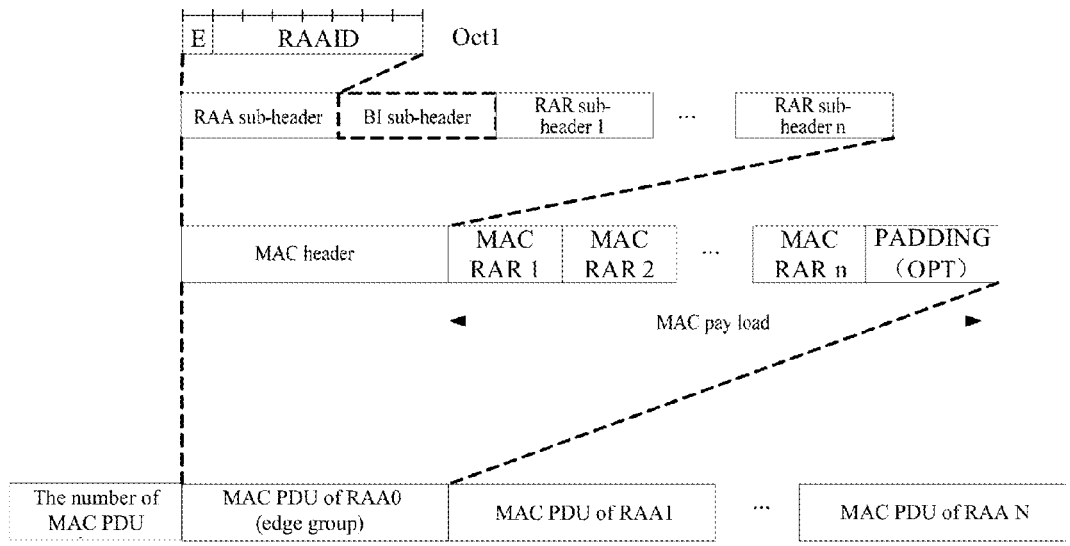
FIG. 7A is a structural schematic diagram of another frame for carrying a random access response message according to an embodiment of the present application.

Optionally, as shown in FIG. 7A, besides the at least one MAC PDU corresponding to the RAA in which the RAP is detected, the first PDU set, transmitted to the UE by the base station on the PDSCH, may also include one MAC PDU for carrying a second RAR message of the UE in the random access area edge group, and a header of each MAC PDU carries the RAAID of the corresponding RAA. Optionally, the first PDU set may also include one field for carrying the number of the MAC PDU in the first PDU set.

Figure 7B:
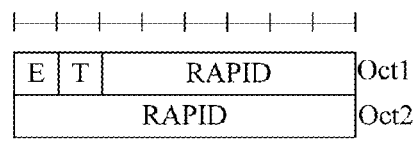
FIG. 7B is a structural schematic diagram of a frame of a RAR sub-header according to an embodiment of the present application.

In an embodiment of the present application, in the case where the number of the RAP sequence assigned by the system assigns to the random access area central group is greater than 64, a length of each RAR sub-header should be increased to 16 bits in the corresponding MAC PDU. For example, the structure of the RAR sub-header is shown in FIG. 7B. In the structure shown in FIG. 7B, the RAR sub-header may include an extension field E, a type field T, and a field for carrying the RAPID. It should be understood that the structure shown in FIG. 7B may also be employed by the RAR sub-header of the MAC PDU for carrying the second RAR message, which will not be limited by the embodiment of the present application.

Figure 8:
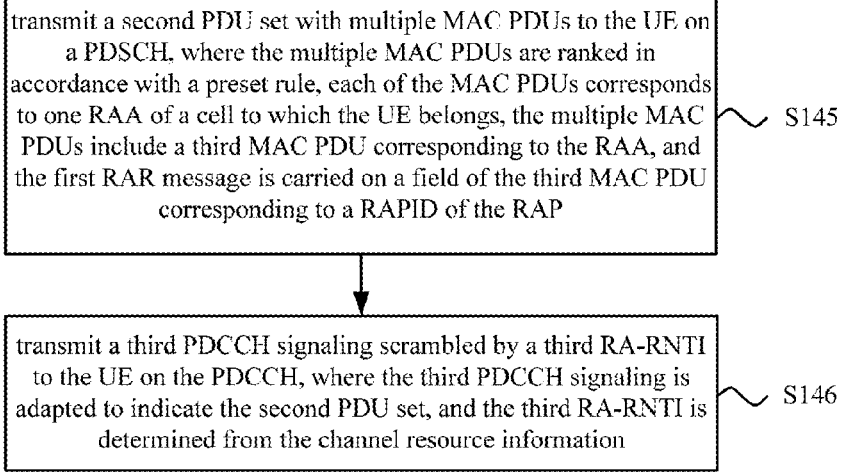
FIG. 8 is a schematic flowchart of yet another method for transmitting a first random access response message according to an embodiment of the present application.

In an embodiment of the present application, as illustrated in FIG. 8, a method 140 for transmitting a first random access response message according to an embodiment of the application includes: Step 145 to Step 146.

In Step 145, the base station transmits a second PDU set with multiple MAC PDUs to the UE on a PDSCH, where the multiple MAC PDUs are ranked in accordance with a preset rule, each of the multiple MAC PDUs corresponds to one RAA of a cell to which the UE belongs, the multiple MAC PDUs include a third MAC PDU corresponding to the RAA, and the first RAR message is carried on a field of the third MAC PDU corresponding to a random access preamble identity (RAPID) of the random access preamble.

In Step 146, the base station transmits to the UE a third PDCCH signaling scrambled by a third RA-RNTI on the PDCCH, where the third PDCCH signaling is adapted to indicate the second PDU set, and the third RA-RNTI is determined from the channel resource information.

For example, the multiple MAC PUDs in the second PDU set may be ranked in accordance with a serial number of the corresponding RAA, as illustrated in FIG. 7A. Because the multiple MAC PUDs are ranked in accordance with the preset rule, the header of each MAC PDU may not carry the RAAID of the corresponding RAA. Optionally, in addition to the above multiple MAC PDUs, the second PDU set may also include one MAC PDU for carrying the second RAR messages of the UEs which belong to the random access area edge group in each random access area. Optionally, the second PDU set may also include one field for carrying the number of the MAC PDUs in the second PUD set.

Therefore, with the method for transmitting the random access response message according to the embodiment of the present application, the RAR message is transmitted on the basis of the random access preamble and the RAA, such that different RAR messages may be transmitted in response to the random access requests in different RAAs based on the same RAP. Therefore, the collision probability may be reduced during the transmission of the RAR and the success rate of the random access is increased.

The method for transmitting the random access response message according to the embodiment of the application is described in detail above in conjunction with FIG. 1 to FIG. 8 from a side of the base station. A method for transmitting a random access response message according to an embodiment of the application is described as follows in conjunction with FIG. 9 to FIG. 14 from a side of the user equipment.

Figure 9:
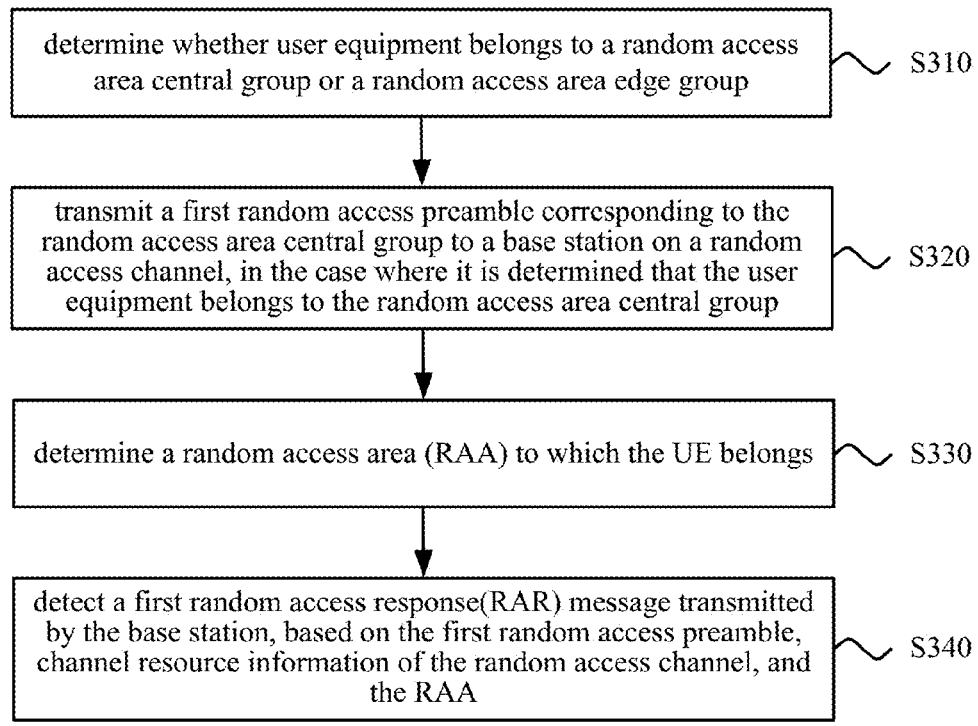
FIG. 9 is a schematic flowchart of another method for transmitting a random access response message according to an embodiment of the present application.

FIG. 9 illustrates a schematic flowchart of a method 300 for transmitting a random access response message according to another embodiment of the present application. As illustrated in FIG. 9, the method includes: Step 310 to Step 340.

Step 310 is to determine whether user equipment belongs to a random access area central group or a random access area edge group.

Step 320 is to transmit a first random access preamble corresponding to the random access area central group to a base station on a random access channel, in the case that the user equipment belongs to the random access area central group.

Step 330 is to determine a random access area (RAA) to which the user equipment belongs.

Step 340 is to detect a first random access response (RAR) message transmitted by the base station based on the first random access preamble, channel resource information of the random access channel, and the RAA.

In Step 310, the user equipment determines whether it belongs to the random access area central group or the random access area edge group.

Figure 10:
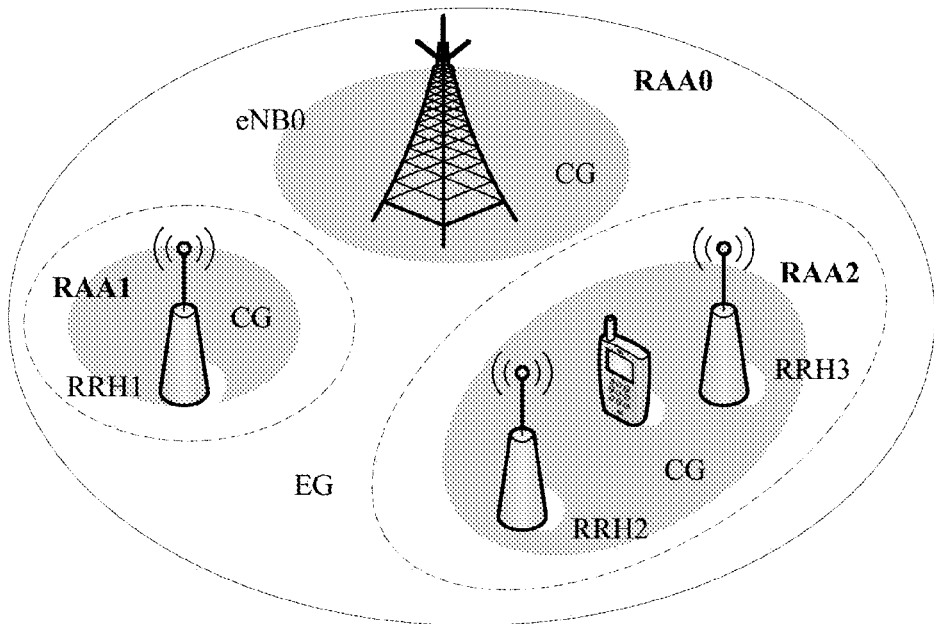
FIG. 10 is a schematic diagram of a random access area center group and a random access area edge group according to an embodiment of the present application.

In the embodiment of the present application, the UE may determine whether it belongs to the random access area central group or the random access area edge group according to a geographical location thereof. Specifically, as shown in FIG. 10, if the UE is located in an area of the random access area central group (abbreviated as "CG"), it may be considered that the UE belongs to the random access area central group. If the UE is located in an area of the random access area edge group (abbreviated as "EG"), it may be considered that the UE belongs to the random access area edge group.

Optionally, the UE may determine whether it belongs to the random access area central group or the random access area edge group according to a path-loss measured from a macro site and each RRH. Specifically, as shown in FIG. 10, if the UE determines that the measured path-losses from the RRH2 and the RRH3 is far less than the path-loss from the eNBO or the RRH1, it may be considered that the UE belongs to the random access area central group. In the whole cell, there are UEs which belong to the random access area central group in each RAA. The whole cell may include one or more edge groups.

In Step 320, the UE transmits the first random access preamble corresponding to the random access area central group to the base station on the random access channel, in the case where it is determined that the UE belongs to the random access area central group.

The random access channel may include a PRACH channel. The random access preamble may include a random access channel (RACH) preamble sequence of the LTE system. For example, it is supposed that there are 64 available RAPs in a cell. The former 32 RAPs are preset to be used by the random access area edge group; and the later 32 RAPs are preset to be used by the random access area central group. If the UE determines that it belongs to the random access area central group, it may select one RAP from the later 32 RAPs and transmit the selected RAP to the base station on the random access channel.

In Step 330, the UE determines the RAA to which the UE belongs.

The random access area may be divided in accordance with the path-loss of the uplink channel or a geographical location. Therefore, the UE may determine the random access area to which the UE belongs, by measuring the downlink pilot or the reference signal of each RRH or macro site. The UE may also determine the geographical location thereof by GPS information carried by the UE.

In Step 340, the UE detects a first random access response (RAR) message transmitted by the base station, based on the first random access preamble, channel resource information of the random access channel, and the RAA.

The channel resource information for example includes time frequency resource information of the random access channel, such as a sub-frame identity and a frequency band identity of a sub-frame occupied by the PRACH. For example, the UE may detect the first RAR message transmitted by the base station, based on the random access preamble identity, the sub-frame identity and the frequency band identity of the PRACH, and an identity of the RAA to which the UE belongs. Thus, the UEs can obtain their own RAR messages in the case where the UEs in different RAAs transmit the random access requests based on the same RAP, and then each UE may perform the subsequent random access procedure according to respective RAR message.

Therefore, in the method for transmitting the random access response message according to the embodiment of the present application, the RAR message is transmitted on the basis of the random access preamble and the RAA, such that different RAR messages may be transmitted in response to the random access requests sent by the UEs in different random access areas based on the same random access preamble. Thus, the collision probability is reduced during the transmission of the RAR and the success rate of the random access is increased.

Figure 11:
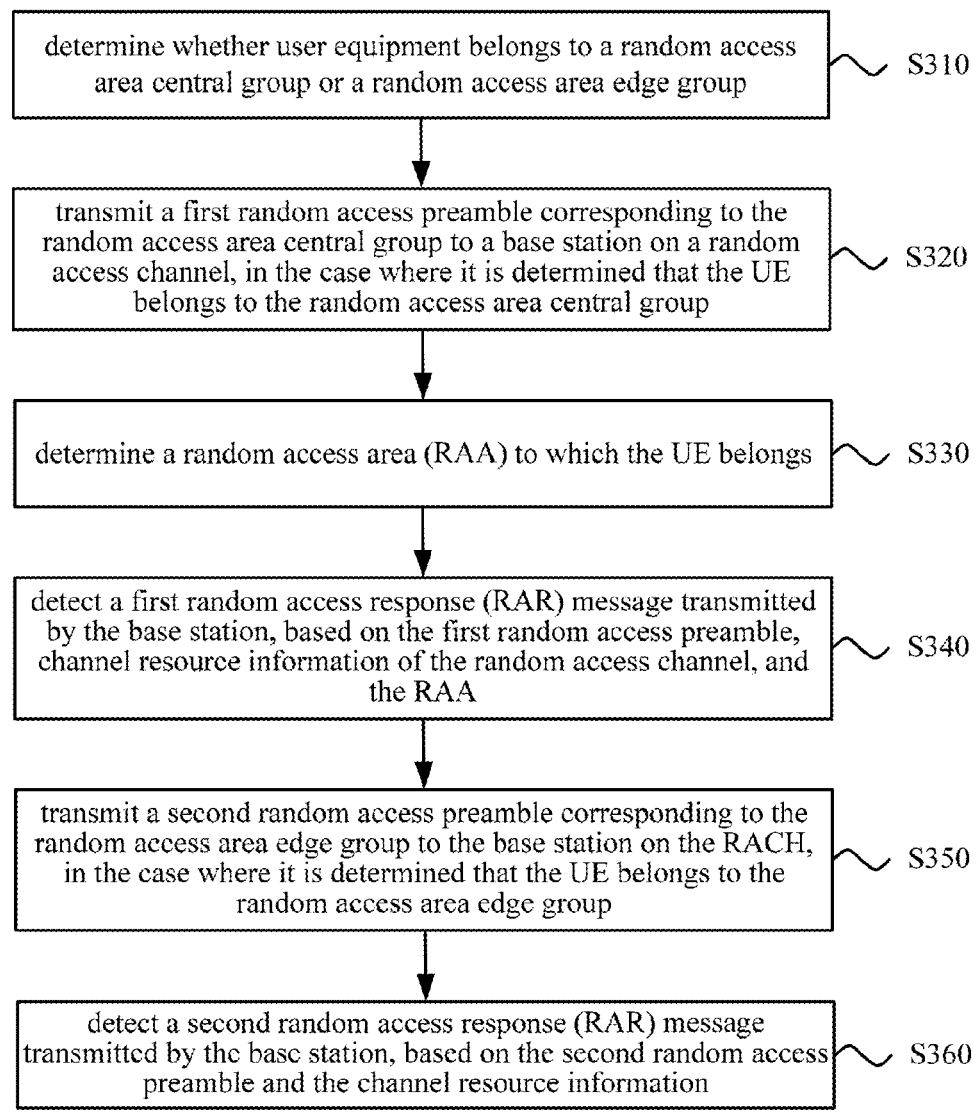
FIG. 11 is another schematic flowchart of another method for transmitting a random access response message according to an embodiment of the present application.

In an embodiment of the application, as shown in FIG. 11, a method 300 for transmitting a random access response message according to the embodiments of the present application further includes: Step 350 to Step 360.

Step 350 is to transmit a second random access preamble corresponding to the random access area edge group to the base station on the random access channel, in the case where it is determined that the UE belongs to the random access area edge group.

Step 360 is to detect a second RAR message transmitted by the base station based on the second random access preamble and the channel resource information.

It should be understood that the UE may determine a RA-RNTI for scrambling the control signaling based on the second random access preamble and the channel resource information, and then demodulates the control signaling to acquire the corresponding second RAR message according to the indication of the control signaling.

It should be understood that, in the contention based random access procedure, after detecting the first RAR message or the second RAR message transmitted by the base station, the UE is required to transmit a random access procedure message to the base station on the PDSCH designated in the RAR message, according to a temporary cell-radio network temporary identity (C-RNTI) in the RAR message, where the random access procedure message includes an identifier of the UE located in this cell and is used for a contention resolution. The UE is required to receive a contention resolution message transmitted by the base station, thereby completing the random access procedure.

Figure 12:
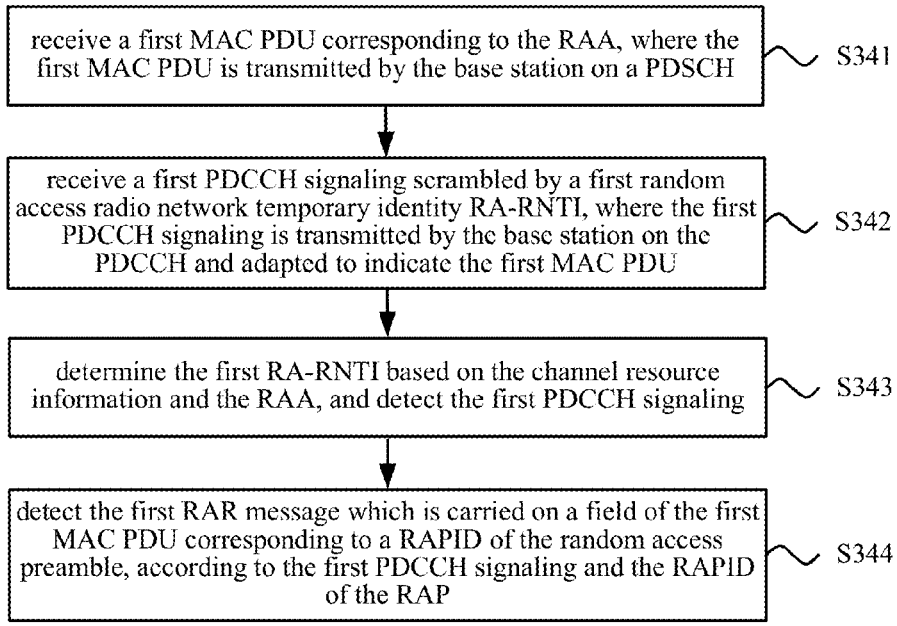
FIG. 12 is a schematic flowchart of another method for detecting a first random access response message according to an embodiment of the present application.
Figure 13:
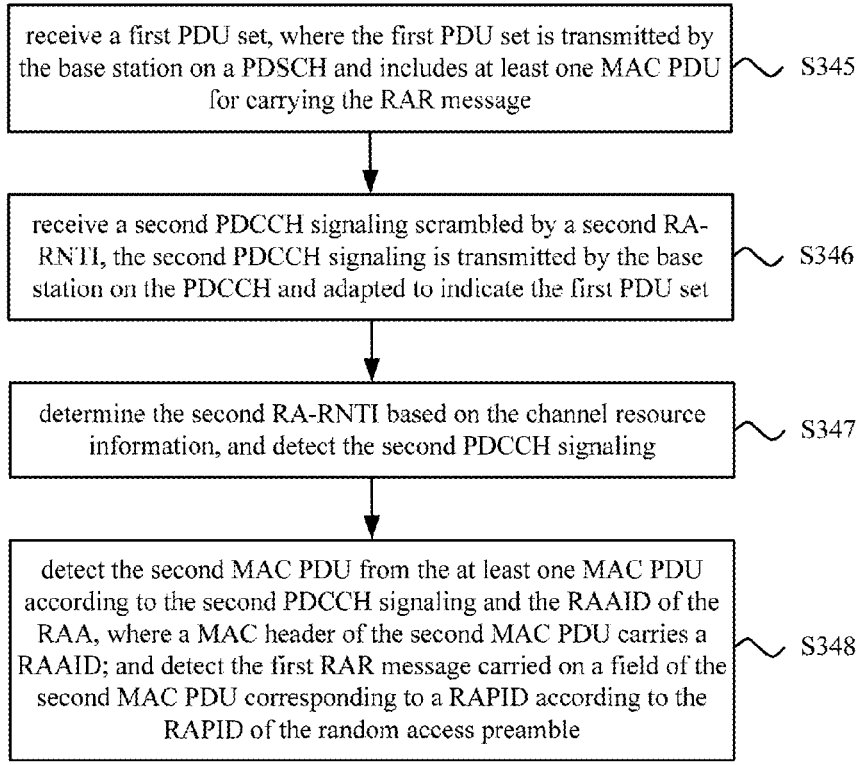
FIG. 13 is another schematic flowchart of another method for detecting a first random access response message according to an embodiment of the present application.
Figure 14:
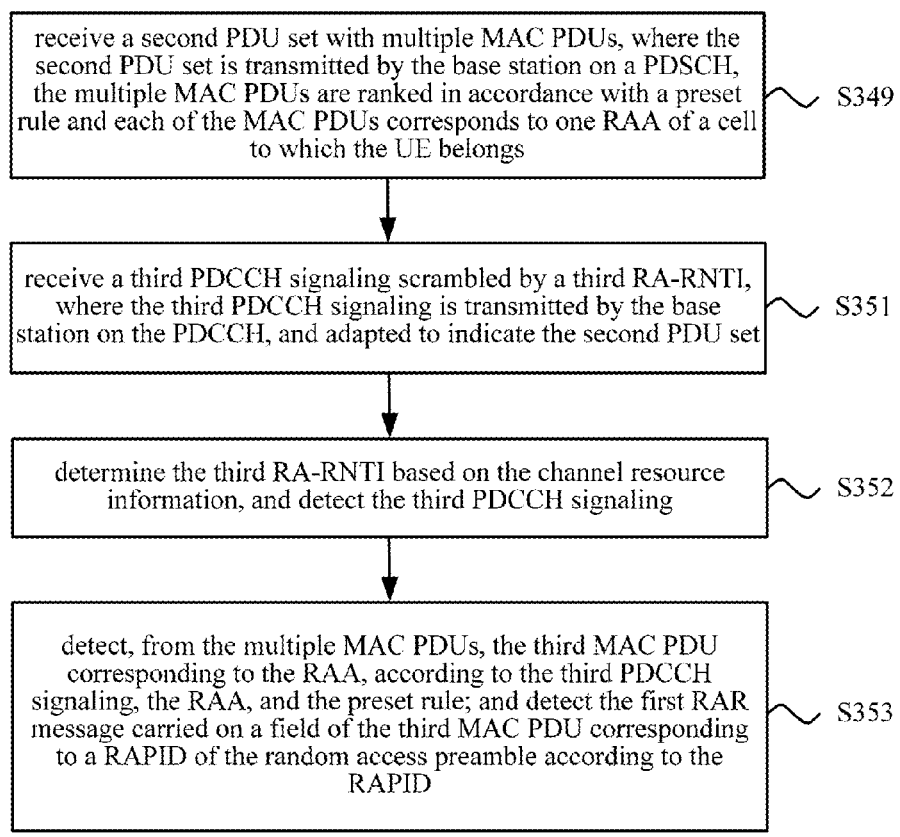
FIG. 14 is yet another schematic flowchart of another method for detecting a first random access response message according to an embodiment of the present application.

A method for transmitting a random access response message according to an embodiment of the application is described in detail in conjunction with FIG. 12 to FIG. 14, taking a LTE system as an example.

FIG. 12 illustrates a schematic flowchart of a method 340 for detecting a random access response message according to an embodiment of the application. As illustrated in FIG. 12, the method 340 includes: Step 341 to Step 344.

Step 341 is to receive a first medium access control (MAC) protocol data unit (PDU) corresponding to the RAA, where the MAC PDU is transmitted by the base station on a physical downlink shared channel (PDSCH).

Step 342 is to receive a first physical downlink control channel (PDCCH) signaling scrambled by a first random access radio network temporary identity (RA-RNTI), where the first PDCCH signaling is transmitted by the base station on the PDCCH and adapted to indicate the first MAC PDU.

Step 343 is to determine the first RA-RNTI based on the channel resource information and the RAA, and detecting the first PDCCH signaling.

Step 344 is to detect the first RAR message which is carried on a field of the first MAC PDU corresponding to a random access preamble identity (RAPID) of the RAP, according to the first PDCCH signaling and the RAPID.

In an embodiment of the application, optionally, a value M of the first RA-RNTI is determined by the following equation (3):

$$M = 1 + T\_ID + 10 \times F\_ID + X \quad (3)$$

where T_ID is a value of a sub-frame identity in the channel resource information, F_ID is a value of a frequency band identity in the channel resource information, and X is an offset related to the RAA.

Optionally, the offset X may be determined by the following equation:

$$X = RAA\_ID \times [1 + \max(T\_ID) + 10 \times \max(F\_ID)] \quad (4)$$

where RAA_ID is a value of a random access area identity (RAAID) of the RAA.

Therefore, in the method for transmitting the random access response message according to the embodiments of the application, the RAR message is transmitted on the basis of the random access preamble and the RAA, such as different RAR messages may be transmitted in response to the random access requests sent by the UEs in different random access areas based on the same random access preamble. Thus, the collision probability is reduced during the transmission of the RAR and the success rate of the random access is increased.

FIG. 13 illustrates another schematic flowchart of a method 340 for detecting a first random access response message according to an embodiment of the application. As illustrated in FIG. 13, the method 340 may include: Step 345 to Step 348.

Step 345 is to receive a first PDU set, where the first PDU set is transmitted by the base station on a PDSCH and includes at least one MAC PDU for carrying the RAR message.

Step 346 is to receive a second PDCCH signaling scrambled by a second RA-RNTI, where the second PDCCH signaling is transmitted by the base station on the PDCCH and adapted to indicate the first PDU set.

Step 347 is to determine the second RA-RNTI based on the channel resource information, and detecting the second PDCCH signaling.

Step 348 is to detect the second MAC PDU from the at least one MAC PDU according to the second PDCCH signaling and the random access area identity (RAAID) of the RAA, where a MAC header of the second MAC PDU carries the RAAID; and detecting the first RAR message carried on a field of the second MAC PDU corresponding to the random access preamble identity (RAPID) according to the RAPID of the random access preamble.

In an embodiment of the application, as shown in FIG. 14, the method 340 may include: Step 349, Step 351, Step 352 and Step 353.

Step 349 is to receive a second PDU set with multiple MAC PDUs, where the second PDU set is transmitted by a base station on a PDSCH, the multiple MAC PDUs are ranked in accordance with a preset rule, and each of the multiple MAC PDUs corresponds to one random access area of a cell to which the UE belongs.

Step 351 is to receive a third PDCCH signaling scrambled by a third RA-RNTI, where the third PDCCH signaling is transmitted by the base station on the PDCCH and adapted to indicate the second PDU set.

Step 352 is to determine the third RA-RNTI based on the channel resource information, and detecting the third PDCCH signaling.

Step 353 is to detect, from the multiple MAC PDUs, the third MAC PDU corresponding to the RAA, according to the third PDCCH signaling, the RAA, and the preset rule; and detecting the first RAR message carried on a field of the third MAC PDU corresponding to a random access preamble identity (RAPID) according to the RAPID of the random access preamble.

In the embodiment of the present application, the format of the MAC PDU may refer to FIG. 5 and the format of the PDU set may refer to FIG. 7, which will be omitted herein for the concision. It should be understood that the interaction between the UE and the base station, the related character, function, and the like described by UE side corresponds to the description of the base station side, for purpose of brevity, which is not repeated herein.

It should also be understood that, in the embodiment of the present application, the size of the serial number of the above-described process is not intended to mean the order of the execution. The order for executing the above-described process should be determined by its functions and inherently logic, and should not be construed as limiting the embodiment of the present application in any way.

Therefore, in the method for transmitting the random access response message according to the embodiment of the present application, the RAR message is transmitted on the basis of the random access preamble and the RAA, such that different RAR messages may be transmitted in response to the random access requests sent by the UEs in different random access areas based on the same random access preamble. Thus, the collision probability is reduced during the transmission of the RAR and the success rate of the random access is increased.

The method for transmitting the random access response message according to the embodiment of the application is described in detail above in conjunction with Figue1 to FIG. 14. A base station and user equipment according to an embodiment of the application are described as follows in conjunction with FIG. 15 to FIG. 24.

Figure 15:
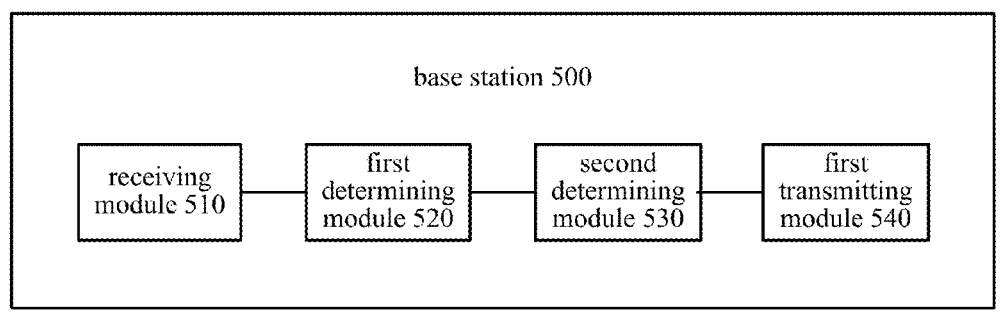
FIG. 15 is a schematic block diagram of a base station according to an embodiment of the present application.

FIG. 15 illustrates a schematic block diagram of a base station 500 according to an embodiment of the application. As shown in FIG. 15, the base station 500 includes: a receiving module 510, a first determining module 520, a second determining module 530 and a first transmitting module 540.

The receiving module 510 is adapted to receive a random access preamble, where the random access preamble is transmitted by user equipment on a random access channel.

The first determining module 520 is adapted to determine whether the user equipment belongs to a random access area central group or a random access area edge group according to the random access preamble received by the receiving module 510.

The second determining module 530 is adapted to determine a random access area (RAA) to which the user equipment belongs, in the case where the first determining module 520 determines that the UE belongs to the random access area central group.

The first transmitting module 540 is adapted to transmit a first random access response (RAR) message to the user equipment based on the random access preamble received by the receiving module 510, channel resource information of the random access channel, and the RAA determined by the second determining module 530.

Therefore, the base station for transmitting the random access response message according to the embodiment of the application transmits the random access response message on the basis of the random access preamble and the RAA. Thus, different RAR messages may be transmitted in response to the random access requests sent by the UEs in different random access areas based on the same random access preamble. Therefore, the collision probability is reduced during the transmission of the RAR and the success rate of the random access may be increased.

Figure 16:
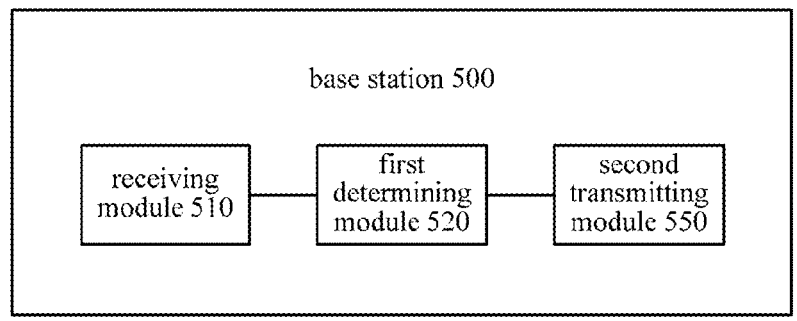
FIG. 16 is another schematic block diagram of a base station according to an embodiment of the present application.

In an embodiment of the application, as shown in FIG. 16, the base station 500 further includes a second transmitting module 550.

The second transmitting module 550 is adapted to transmit a second random access response (RAR) message to the user equipment, based on the random access preamble and the channel resource information, in the case where the first determining module 520 determines that the user equipment belongs to the random access area edge group.

Figure 17:
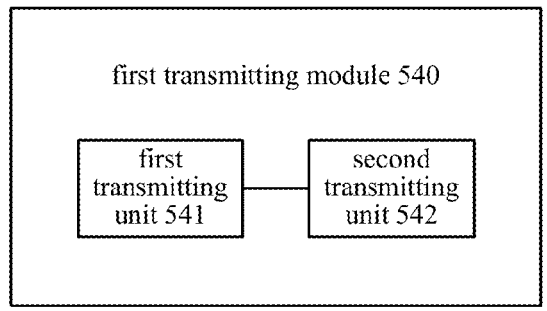
FIG. 17 is a schematic block diagram of a first transmitting module according to an embodiment of the present application.

Optionally, as shown in FIG. 17, the first transmitting module 540 includes: a first transmitting unit 541 and a second transmitting unit 542.

The first transmitting unit 541 is adapted to transmit to the user equipment a first medium access control (MAC) protocol data unit (PDU) corresponding to the RAA on a physical downlink shared channel (PDSCH), where a field of the first MAC PDU corresponding to a random access preamble identity (RAPID) of the random access preamble carries the first RAR message.

The second transmitting unit 542 is adapted to transmit to the UE a first physical downlink control channel (PDCCH) signaling scrambled by a first random access radio network temporary identity (RA-RNTI) on the PDCCH, where the first PDCCH signaling is adapted to indicate the first MAC PDU transmitted by the first transmitting unit 541, and the first RA-RNTI is determined from the channel resource information and the RAA.

In an embodiment of the application, a value M of the first RA-RNTI is determined by the following equation (5):

$$M=1+T\_ID+10 \times F\_ID+X \quad (5)$$

where T_ID is a value of a sub-frame identity in the channel resource information, F_ID is a value of a frequency band identity in the channel resource information, and X is an offset related to the RAA.

Optionally, the offset X is determined by the following equation (6):

$$X=RAA\_ID \times [1+\max(T\_ID)+10 \times \max(F\_ID)] \quad (6)$$

where RAA_ID is a value of a random access area identity (RAAID) of the RAA.

Figure 18:
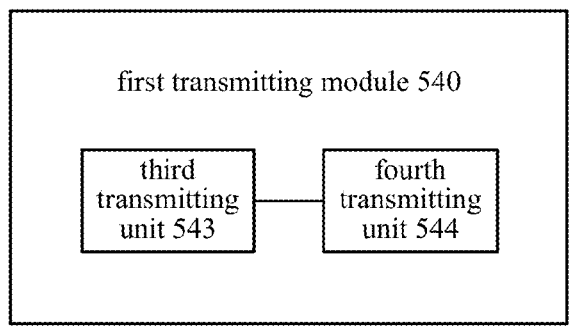
FIG. 18 is another schematic block diagram of a first transmitting module according to an embodiment of the present application.

In an embodiment of the present application, as shown in FIG. 18, the first transmitting module 540 may include a third transmitting unit 543 and a fourth transmitting unit 544.

The third transmitting unit 543 is adapted to transmit a first PDU set to the user equipment on a physical downlink shared channel (PDSCH), where the first PDU set includes at least one MAC PDU for carrying the RAR message, a random access area identity (RAAID) of the RAA is carried on a MAC header of a second MAC PDU corresponding to the RAA in the at least one MAC PDU, and the first RAR message is carried on a field of the second MAC PDU corresponding to a random access preamble identity (RAPID) of the random access preamble.

The fourth transmitting unit 544 is adapted to transmit a second PDCCH signaling scrambled by a second RA-RNTI to the UE on the PDCCH, where the second PDCCH signaling is adapted to indicate the first PDU set transmitted by the third transmitting unit 543, and the second RA-RNTI is determined from the channel resource information.

Figure 19:
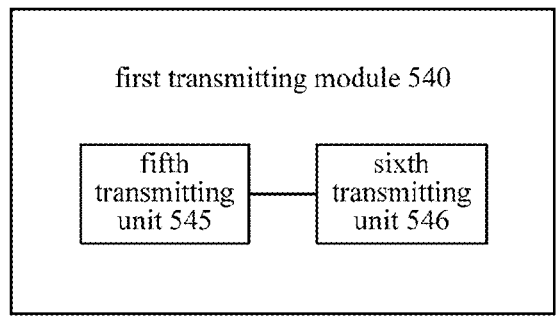
FIG. 19 is yet another schematic block diagram of a first transmitting module according to an embodiment of the present application.

Optionally, as illustrated in FIG. 19, the first transmitting module 540 includes: a fifth transmitting unit 545 and a sixth transmitting module 546.

The fifth transmitting unit 545 is adapted to transmit a second PDU set with multiple MAC PDUs to the user equipment on the PDSCH, where the multiple MAC PDUs are ranked in accordance with a preset rule, each of the multiple MAC PDUs corresponds to one RAA of a cell to which the UE belongs, the multiple MAC PDUs include a third MAC PDU corresponding to the RAA, and the first RAR message is carried on a field of the third MAC PDU corresponding to a random access preamble identity (RAPID) of the random access preamble.

The sixth transmitting module 546 is adapted to transmit a third PDCCH signaling scrambled by a third RA-RNTI to the user equipment on the PDCCH, where the third PDCCH signaling is adapted to indicate the second PDU set transmitted by the fifth transmitting unit 545, and the third RA-RNTI is determined from the channel resource information.

It should be understood that the base station 500 according to the embodiment of the present application may correspond to the base station used in the method for transmitting the random access response message according to the embodiment of the present application. The above-described and other operation and function of each module of the base station 500 are adapted to implement the flow corresponding to each method in the FIGS. 1 to 14, which will be omitted herein for the concision.

Therefore, the base station for transmitting the random access response messages according to the embodiments of the present application transmits the RAR message on the basis of the random access preamble and the RAA. Thus, different RAR messages may be transmitted in response to the random access requests sent by the user equipments in different random access areas based on the same random access preamble. Therefore, the collision probability may be reduced during the transmission of the RAR and the success rate of the random access may be increased.

Figure 20:
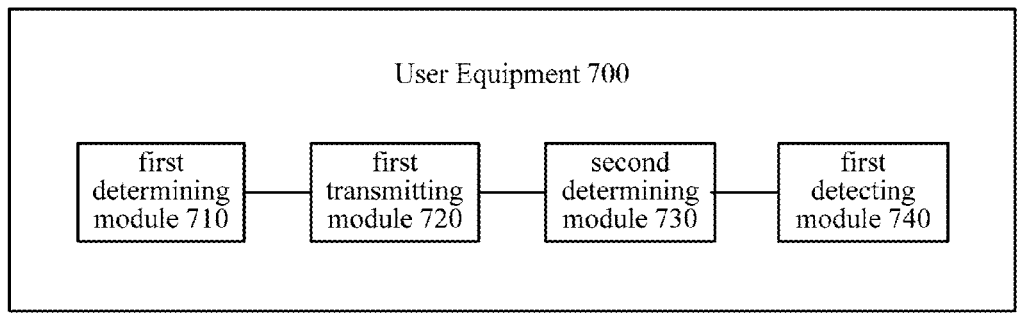
FIG. 20 is a schematic block diagram of a user equipment according to an embodiment of the present application.

FIG. 20 illustrates a schematic block diagram of user equipment 700 according to an embodiment of the present application. As shown in FIG. 20, the UE 700 includes: a first determining module 710, a first transmitting module 720, a second determining module 730 and a first detecting module 740.

The first determining module 710 is adapted to determine whether the user equipment belongs to a random access area central group or a random access area edge group.

The first transmitting module 720 is adapted to transmit a first random access preamble corresponding to the random access area central group to a base station on a random access channel, in the case where the first determining module determines that the user equipment belongs to the random access area central group.

The second determining module 730 is adapted to determine a random access area (RAA) to which the UE belongs.

The first detecting module 740 is adapted to detect a first random access response (RAR) message transmitted by the base station, based on the first random access preamble transmitted by the first transmitting module 720, channel resource information of the random access channel, and the RAA determined by the second determining module 730.

Therefore, the user equipment for transmitting the random access response message according to the embodiment of the present application transmits the RAR message on the basis of the random access preamble and the RAA. Thus, different RAR messages may be transmitted in response to the random access requests sent by the user equipment in different random access areas based on the same random access preamble. Therefore, the collision probability may be reduced during the transmission of the RAR and the success rate of the random access may be increased.

Figure 21:
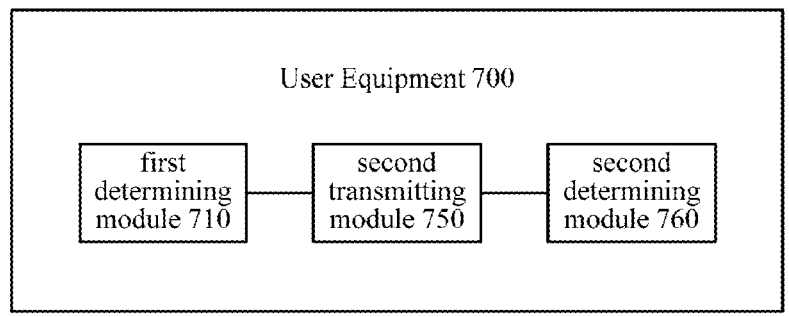
FIG. 21 is another schematic block diagram of a user equipment according to an embodiment of the present application.

In the embodiment of the present application, as shown in FIG. 21, the UE 700 may further include a second transmitting module 750 and a second detecting module 760.

The second transmitting module 750 is adapted to transmit a second random access preamble corresponding to the random access area edge group to the base station on the random access channel, in the case where the first determining module determines that the UE belongs to the random access area edge group.

The second detecting module 760 is adapted to detect a second random access response (RAR) message transmitted by the base station based on the second random access preamble transmitted by the second transmitting module 750 and the channel resource information.

Figure 22:
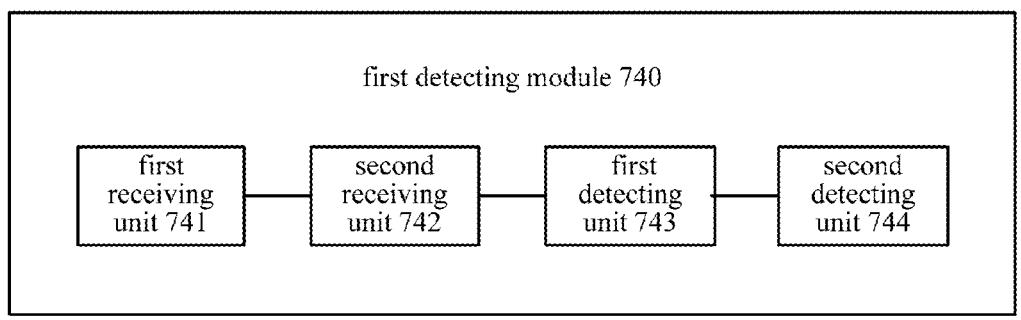
FIG. 22 is a schematic block diagram of a first detecting module according to an embodiment of the present application.

Optionally, as shown in FIG. 22, the first detecting module 740 includes: a first receiving unit 741, a second receiving unit 742, a first detecting unit 743 and a second detecting unit 744.

The first receiving unit 741 is adapted to receive a first medium access control (MAC) protocol data unit (PDU) corresponding to the RAA, where the first MAC PDU is transmitted by the base station on a physical downlink shared channel (PDSCH).

The second receiving unit 742 is adapted to receive a first physical downlink control channel (PDCCH) signaling scrambled by a first random access radio network temporary identity (RA-RNTI), where the first PDCCH signaling is transmitted by the base station on the PDCCH and is adapted to indicate the first MAC PDU received by the first receiving unit 741.

The first detecting unit 743 is adapted to determine the first RA-RNTI based on the channel resource information and the RAA, and detect the first PDCCH signaling received by the second receiving unit 742.

The second detecting unit 744 is adapted to detect the first RAR message, which is carried on the field of the received first MAC PDU corresponding to a random access preamble identity (RAPID), according to the first PDCCH signaling detected by the first detection unit 743 and the RAPID of the random access preamble.

In the embodiment of the present application, the value M of the first RA-RNTI is determined by the following equation (7):

$$M = 1 + T\_ID + 10 \times F\_ID + X \quad (7)$$

where T_ID is a value of a sub frame identity in the channel resource information, F_ID is a value of a frequency band identity in the channel resource information, and X is an offset related to the RAA.

Optionally, the offset X is determined by the following equation (8):

$$X = RAA\_ID \times [1 + \max(T\_ID) + 10 \times \max(F\_ID)] \quad (8)$$

where RAA_ID is a value of a random access area identity (RAAID) of the RAA.

Figure 23:
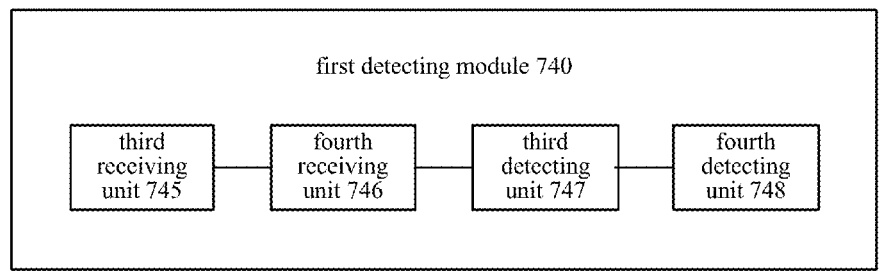
FIG. 23 is another schematic block diagram of a first detecting module according to an embodiment of the present application.

Optionally, as shown in FIG. 23, the first detecting module 740 includes: a third receiving unit 745, a fourth receiving unit 746, a third detecting unit 747 and a fourth detecting unit 748.

The third receiving unit 745 is adapted to receive a first PDU set transmitted by the base station on a PDSCH, where the first PDU set includes at least one MAC PDU for carrying the RAR message.

The fourth receiving unit 746 is adapted to receive a second PDCCH signaling which is scrambled by a second RA-RNTI and transmitted by the base station on the PDCCH, where the second PDCCH signaling is adapted to indicate the first PDU set received by the third receiving unit 745.

The third detecting unit 747 is adapted to determine the second RA-RNTI based on the channel resource information, and detect the second PDCCH signaling received by the fourth receiving unit 746.

The fourth detecting unit 748 is adapted to detect the second MAC PDU from the at least one MAC PDU in the first PDU set received by the third receiving unit 745, according to the second PDCCH signaling detected by the third detecting unit 747 and the random access area identity (RAAID) of the RAA, where a MAC header of the second MAC PDU carries the RAAID; and detect the first RAR message carried on a field of the first MAC PDU corresponding to a random access preamble identity (RAPID) according to the RAPID of the random access preamble.

Figure 24:
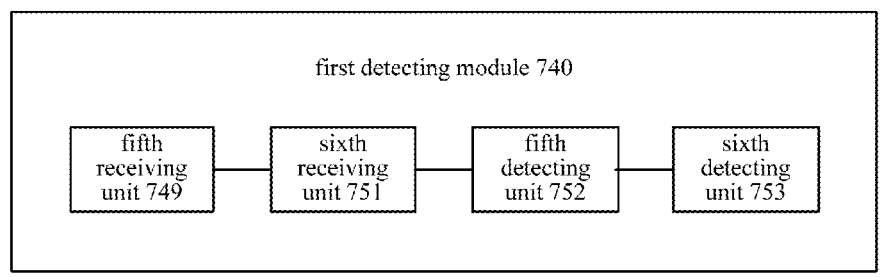
FIG. 24 is yet another schematic block diagram of a first detecting module according to an embodiment of the present application.

Optionally, as shown in FIG. 24, the first detecting module 740 includes: a fifth receiving unit 749, a sixth receiving unit 751, a fifth detecting unit 752, and a sixth detecting unit 753.

The fifth receiving unit 749 is adapted to receive a second PDU set with multiple MAC PDU, where the second PDU set is transmitted by the base station on the PDSCH, the multiple MAC PDUs are ranked in accordance with a preset rule and each of the multiple MAC PDUs corresponds to one random access area of a cell to which the UE belongs.

The sixth receiving unit 751 is adapted to receive a third PDCCH signaling scrambled by a third RA-RNTI and transmitted by the base station on the PDCCH, where the third PDCCH signaling is adapted to indicate the second PDU set received by the fifth receiving unit 749.

The fifth detecting unit 752 is adapted to determine the third RA-RNTI based on the channel resource information, and detect the third PDCCH signaling received by the sixth receiving unit 751.

The sixth detecting unit 753 is adapted to detect, from the multiple MAC PDUs in the second PDU set received by the fifth receiving unit 749, the third MAC PDU corresponding to the RAA according to the third PDCCH signaling detected by the fifth detecting unit 752, the RAA, and the preset rule; and detect the first RAR message carried on a field of the third MAC PDU corresponding to a random access preamble identity (RAPID) according to the RAPID of the random access preamble.

It should be understood that the user equipment 700 according to the embodiment of the application may correspond to the user equipment used in the method for transmitting the random access response message according to the embodiment of the application. The above-described and other operation and function of each module of the user equipment 700 are adapted to implement the flow corresponding to each method in the FIGS. 1 to 14, which will be omitted herein for the concision.

Therefore, the user equipment for transmitting the random access response message according to the embodiment of the present application transmits the RAR message on the basis of the random access preamble and the RAA. Thus, different RAR messages may be transmitted in response to the random access requests sent by the user equipment in different random access areas based on the same random access preamble. Therefore, the collision probability may be reduced during the transmission of the RAR and the success rate of the random access may be increased.

Those skilled in the art may realize that various exemplary units and algorithm steps described in combination with the disclosed embodiments may be implemented as an electronic hardware or a combination of computer software and an electronic hardware. Whether these functions being executed by hardware or software depends on the specific application and design constraints for the technical solutions. Professional and technical personnel may use different methods to achieve the described function for each specific application, but such achievement should not exceed the scope of the application.

Those skilled in the art may clearly understand that the specific work process of the system, the device and the unit described above may refer to the corresponding process in the preceding method embodiments for convenience and conciseness, which is not described here.

According to several embodiments in the application, it should be understood that the disclosed system, device and method may be implemented by other ways. For example, the device embodiment described above is only exemplary. For example, the dividing for the units is only a logical function dividing, in practice there may be another dividing ways, for example multiple units or assemblies may be combined or integrated into another system, or some features may be ignored or not implemented. At another point, the displayed or discussed coupling between each other or direct coupling or communication connection may be indirect coupling or communication connection via some interfaces, devices or units, which may be electrical, mechanical or other forms.

The unit illustrated as a detach component may be physically separated or not, the component displayed as a unit may be a physical unit or not, i.e., it may be located at one position, or may be disposed on multiple network units. The objects of the embodiment solutions may be realized by selecting part or all of the units according to the actual need.

In addition, each function unit in each embodiment of the application may be integrated in one processing unit, or each unit may exist individually physically, or two or more units may be integrated in one unit.

If the described function is implemented by a software function unit and sold or used as an independent product, the function may be stored in a computer readable storage medium. Based on such understanding, the part of the technical solutions of the application contributing to the prior art or part of the technical solutions may be embodied as a computer software product, the computer software product is stored in a storage medium, which includes several instructions to enable a computer apparatus (for example a personal computer, a server or a network apparatus) to perform all or part of the steps of the methods according to each embodiment of the application. In addition, the preceding storage medium includes various types of medium which may store program codes, such as a USB disc, a mobile hard disc, a read only memory (ROM), a random access memory (RAM), a magnetic disc or a compact disc.

What is claimed is:

1. A method for transmitting a random access response (RAR) message, comprising:
   receiving a random access preamble, wherein the random access preamble is transmitted by a user equipment on a random access channel;

determining whether the user equipment belongs to a random access area central group or a random access area edge group according to the random access preamble, wherein the random access preamble is determined based on a path-loss of an uplink channel of the user equipment;

if the user equipment belongs to the random access area edge group, transmitting a first RAR message to the user equipment, based on the random access preamble and the channel resource information.

2. The method according to claim 1, further comprising: transmitting the first RAR message in a medium access control (MAC) protocol data unit (PDU), wherein a MAC header of the MAC PDU indicates the first RAR message to which the random access preamble corresponding.

3. The method according to claim 2, further comprising: transmitting a physical downlink control channel (PDCCH) signaling in the PDCCH, wherein the MAC PDU is indicated by the PDCCH signaling, and the PDCCH signaling is scrambled by a random access radio network temporary identity (RA-RNTI) determined from the random access preamble and the channel resource information.

4. The method according to claim 1, further comprising: if the user equipment belongs to the random access area central group, determining a random access area (RAA) to which the user equipment belongs; transmitting a second RAR message to the user equipment based on the random access preamble, channel resource information of the random access channel and the RAA.

5. A base station, comprising:
a memory storage comprising instructions; and
one or more processors in communication with the memory, wherein the one or more processors execute the instructions to:
receive a random access preamble, wherein the random access preamble is transmitted by a user equipment on a random access channel;
determine whether the user equipment belongs to a random access area central group or an random access area edge group according to the random access preamble, wherein the random access preamble is determined based on a path-loss of an uplink channel of the user equipment;
if the user equipment belongs to the random access area edge group, transmit a first random access response (RAR) message to the user equipment, based on the random access preamble and a channel resource information.

6. The base station according to claim 5, wherein the one or more processors execute the instructions to:
transmit the first RAR message in a medium access control (MAC) protocol data unit (PDU), wherein a MAC header of the MAC PDU indicates the first RAR message to which the random access preamble corresponding.

7. The base station according to claim 6, wherein the one or more processors execute the instructions to:
transmit a physical downlink control channel (PDCCH) signaling in the PDCCH, wherein the MAC PDU is indicated by the PDCCH signaling, and the PDCCH signaling is scrambled by a random access radio network temporary identity (RA-RNTI) determined from the random access preamble and the channel resource information.

8. The base station according to claim 5, the one or more processors execute the instructions to:
if the user equipment belongs to the random access area central group, determining a random access area (RAA) to which the user equipment belongs;
transmitting a second RAR message to the user equipment based on the random access preamble, channel resource information of the random access channel and the RAA.

9. A user equipment, comprising:
a memory storage comprising instructions; and
one or more processors in communication with the memory, wherein the one or more processors execute the instructions to:
determine whether the user equipment belongs to a random access area central group or a random access area edge group;
if the user equipment belongs to the random access area edge group, transmit a first random access preamble corresponding to the random access area edge group to the base station on the random access channel, wherein the random access preamble is determined based on a path-loss of an uplink channel of the user equipment; and
detect a first random access response (RAR) message transmitted by the base station, based on the second random access preamble and a channel resource information.

10. The user equipment according to claim 9, wherein one or more processors execute the instructions to:
receive the first RAR message in a medium access control (MAC) protocol data unit (PDU), wherein a MAC header of the MAC PDU indicates the first RAR message to which the random access preamble corresponding.

11. The user equipment according to claim 10, wherein the one or more processors execute the instructions to:
receive a physical downlink control channel (PDCCH) signaling in the PDCCH, wherein the MAC PDU is indicated by the PDCCH signaling, and the PDCCH signaling is scrambled by a random access radio network temporary identity (RA-RNTI) determined from the random access preamble and the channel resource information.

12. The user equipment according to claim 9, wherein the one or more processors execute the instructions to:
if the user equipment belongs to the random access area central group, transmit a second random access preamble corresponding to the random access area central group to a base station on a random access channel;
determine a random access area (RAA) to which the user equipment belongs; and
detect a second RAR message transmitted by the base station, based on the first random access preamble, channel resource information of the random access channel and the RAA.

* * * * *